(Model.)
T. WEAVER.
NUT LOCK.
No. 275,001. Patented Apr. 3, 1883.
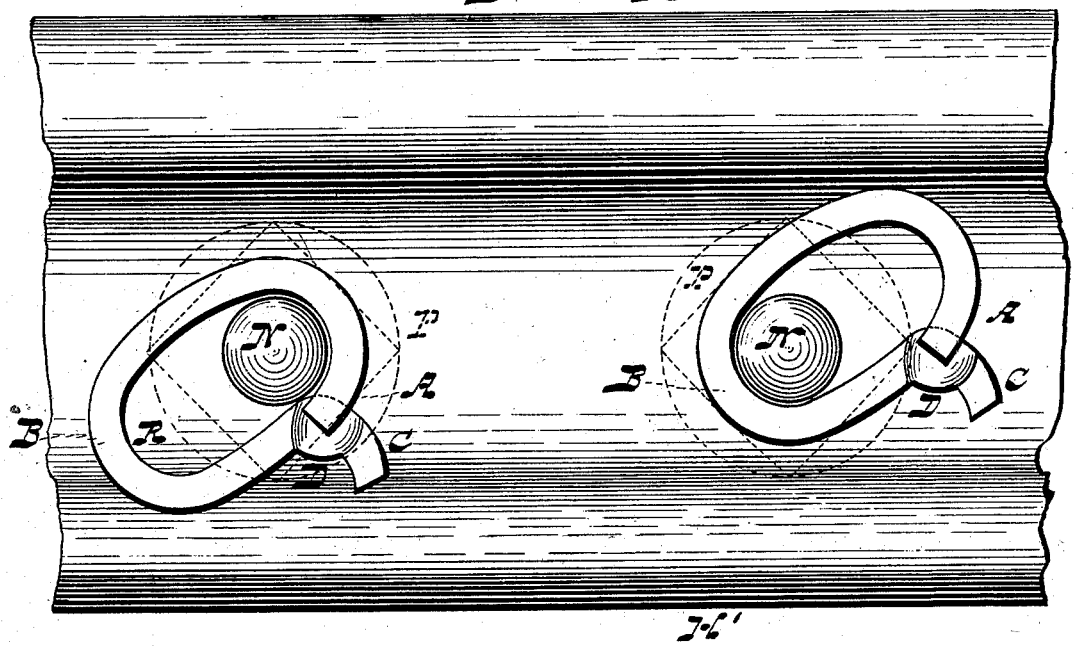
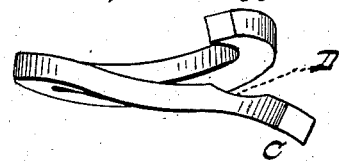
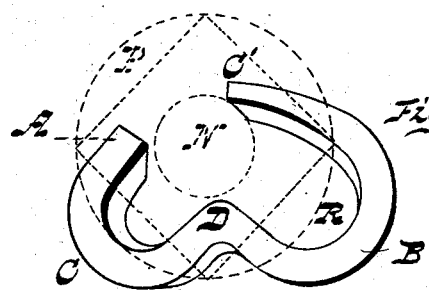
WITNESSES
E. H. Bates.
J. L. Nebinger.
INVENTOR
Theophilus Weaver.

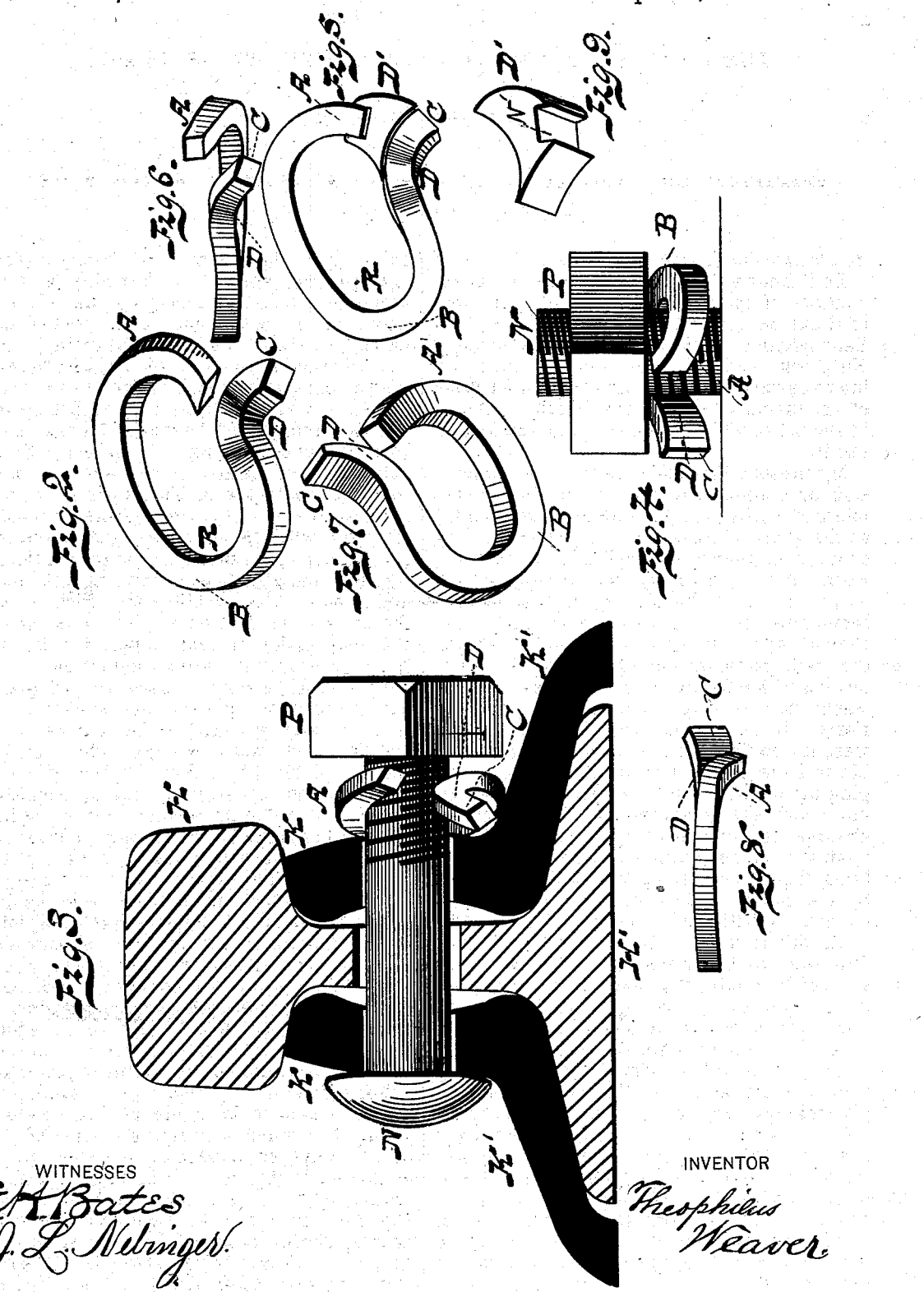

UNITED STATES PATENT OFFICE.

THEOPHILUS WEAVER, OF HARRISBURG, PENNSYLVANIA.

NUT-LOCK.

SPECIFICATION forming part of Letters Patent No. 275,001, dated April 3, 1883.

Application filed December 5, 1882. (Model.)

*To all whom it may concern:*

Be it known that I, THEOPHILUS WEAVER, a citizen of the United States, and a resident of Harrisburg, county of Dauphin and State of Pennsylvania, have invented a new and useful Nut-Lock; and I do hereby declare the following to be such a full, clear, and exact description of the invention as will enable others skilled in the art to which it appertains to make and use it.

My present invention belongs to compression or easement devices applicable to rail-joints of a railway. The same, when modified at the guard thereof, is a non-elastic nut-lock at full compression and well adapted for frog-work and structures for track-crossings of railways. It locks the nut by the action of a semi-spiral spring applied as a washer under the nut, and holding it by its sharpened end directed against its under face. It differs from devices which detain the nut by the end of the washer bar or wire clasping its angles exteriorly. It also differs from certain spring-washers having about one coil terminated in biting ends, whereby to curb the nut by impinging on its under face as in my washer, but which are non-adjustable for unlocking, unsupported against turning, and unguarded against overcompression. Such are liable to be damaged by flattening them and to be broken by wrenching. The latter result occurs if, perchance, its both ends take firm hold. If, to avoid this result, its ends, as usual, are made dull, the lock is unreliable, the washer, being allowed to cant in most cases, also loses its biting inclination at one of its ends. Consequently such washers hold mainly by frictional contact, and allow nuts to slack and run off when used at railway-joints. Moreover, they cannot bite at all while flatly compressed and, not locking tautly, act in said imperfect way after slacking. On the contrary, my washer has adjustability for unlocking its surely-locking detent, bearings in the conformation thereof against turning and canting, and a guard or provision against overcompression, and yet permitting the nut to be jammed tightly on it without damaging effects on its spring or hindering its bite.

The novel features of my nut-locking washer are declared to be, first, an extended semi-spiral open link having an erectly-directed spring-detent applied conformably part way around the bolt and engaging the nut on its under face to lock it, and having its eye elongated as a retreat for the bolt therein, permitting the washer to be shifted endwise to bring said detent out of reach of the nut in reversing it; second, providing the extended spring-washer having erect detent and elongated eye with an inner bearing for contact with the bolt, and with abutting extension or extensions for contact with the flange of the fish-plate or other object to rightly hold the washer after and while being locked by compression; third, a spring-washer adapted to lock the nut through engaging it by a compressible detent underneath it, in combination with a part thereof serving as a guard to limit or modify the compression thereof, to preserve its elasticity, and favor its biting inclination.

I preferably make my washer of spring-steel bar of about one-quarter inch square in section for railway service. The bar is cut to lengths or blanks, and wrought, while hot, into the form desired by aid of a machine the details of whose construction are here omitted. The said guard of my washer may be modified to be either rigid for use on railway-frogs and crossing of tracks by swaging a part of the washer-link wider edgewise for the nut to jam on it; also, a block may be inserted in the link-opening of greater thickness than the bar forming the link, or said guard may be made elastic for general use on railway-tracks by simply boldly denting or crooking the bearing of the link, thus springing a part of the link up from its base, which as a stiff spring affords easement at joints under severe requisition, ordinary wrenching being unable to jam it flat.

For further description of my nut-lock reference is made to the accompanying drawings, Figure 1 of which is a front elevation of part of a railway-frog, showing my washer applied at the left of the view in locking position and on the right the same adjusted or unlocked. Fig. 2 is a perspective view of my washer with bearing dented or sprung as an elastic guard. Fig. 3 is a transverse sectional view of a railway-joint with fish-plates in section, and my washer with sprung guard applied uncompressed. Fig. 4 is a side elevation of my washer with rigid guard under a nut. Fig. 5 is a top view of my washer with sprung or elastic guard, in combination with a removable block, which serves as a rigid guard. Fig. 6 is an edge view of the washer shown applied in Fig. 2. Fig. 7 is a perspective view of the washer shown in Fig. 4. Fig. 8 is an edge view of the same. Fig. 9 is a perspective view of the removable block or rigid guard, same as shown in Fig. 5. Fig. 10 is a perspective view of washer shown in Fig. 1. Fig. 11 is a top view of my washer modified or adapted to be adjusted toward the left for unlocking, and having its tail end swaged wider edgewise as a rigid guard.

Like letters denote like parts in references.

A denotes the erectly-directed biting end or detent in my washer for engaging the nut.

B denotes the end of the extended body or link thereof, serving exteriorly as a bearing for contact with the flange K' of the fish-plate K.

D denotes the inner bearing of the link, serving as such by contact with the bolt N, in combination with the exterior bearings at abutments B and C, to keep the washer against turning and to hold it righted by bracing oppositely by purchase nearly beneath detent A, while it is being compressed.

In the modification shown in Fig. 11, C', the end of bar forming the washer is returned inward to the bolt N opposite the bit A and closely to it, both as a poise or purchase and a supplemental rigid guard to stop the nut thereon. This form of my washer is designed for exceptional situations, where, owing to obstructions, it is more convenient to adjust the same to the left in unlocking the nut.

Said part D also denotes the guard, made rigid, as shown in Figs. 1 and 4, elastic, as shown in Figs. 2 and 3, and convertibly rigid or elastic, as shown in Fig. 5. Said part in Fig. 1 is reduced about one-half the bar thickness by swaging, and the end A is extended a little across the cut or opening of the link and clamped on said part and thereon jamming the nut without flattening the detent. Said part in Fig. 4 is widened edgewise about one-half more than the bar thickness by swaging, which therefore, by being higher than the other parts of the washer, stops the nut rigidly on it before the detent A is fully compressed or its biting inclination is impaired. Said part D in Figs. 2, 3, and 5 is sprung from the base by a bold dent or crook of the bar constituting the washer. Said crooked or sprung part serves as a stiffly-elastic guard. On it the nut jams as tautly as ordinary wrenching can effect, but which will yield a little under severe compression, as when trains lunge heavily. It then, as well as by the sag of worn screw-threads of track bolts and nuts, serves as an easement or powerful follower.

In Fig. 5 is shown how the elastic guard may be suspended by inserting a removable block in the cut or opening of the link, said block being thicker than the body of the link, and stopping the nut when jammed on it, before the washer is fully compressed. The washer, with elastic guard, is the preferable form, yet in certain situations and for certain work the same may be supplied with said block for rigid jamming.

Said block D' is provided with shoulders on either side of a neck or recess, N', by which it is retained in the cut of the washer when it is shifted for unlocking the nut.

In unlocking my washer, by adjusting it toward the right by a well-directed blow on its edge at B, the detent A moves in direction to avoid biting.

I do not limit the use of my washers to railways, nor their make to be of steel or of square stuff, as they can be used elsewhere, and can be made of hard round bar or wire.

I am aware that other nut-locks employed oblong bolt-holes therein; but I am not aware that such was a retreat therein to adjust the locking-detent from under the nut in unlocking the nut.

What I desire to secure and claim is—

1. The extended nut-locking spring-washer set forth, having the erectly-directed biting portion or detent A, adapted to engage the under face of a nut, P, and having eye R thereof elongated as a retreat for the bolt therein, thereby permitting the washer to be shifted endwise to bring said detent out of reach of the nut in reversing it, substantially as specified.

2. The nut-locking spring-washer, with link retreated from the end thereof, provided with the biting part or detent A, and having the inner bearing, D, for contact with a bolt, N, and bearings B C, for outer contact to hold it braced, substantially as and for the purposes set forth.

3. A spring-washer adapted to lock the nut by keenly engaging its under face by a compressible biting part, A, in combination with a part, D or D', serving as a guard to limit the compression thereof, substantially as and for the purposes set forth.

In testimony that I claim the foregoing as my invention I have hereunto set my hand and seal this 4th day of December, A. D. 1882.

THEOPHILUS WEAVER. [L. S.]

Attest:
GEO. FESSENDEN,
PETER STUCKER.